(12) United States Patent
Ban (10) Patent No.: US 12,289,575 B2
(45) Date of Patent: Apr. 29, 2025

(54) WIRELESS COMMUNICATION DEVICE FOR NECK MICROPHONE

(71) Applicant: SIRBAN CO., LTD., Hanam-si (KR)

(72) Inventor: Hansung Ban, Hanam-si (KR)

(73) Assignee: SIRBAN CO., LTD., Hanam-si (KR)

( * ) Notice: Subject to any disclaimer, the term of this patent is extended or adjusted under 35 U.S.C. 154(b) by 244 days.

(21) Appl. No.: 18/035,486

(22) PCT Filed: Nov. 3, 2021

(86) PCT No.: PCT/KR2021/015746
§ 371 (c)(1),
(2) Date: May 4, 2023

(87) PCT Pub. No.: WO2022/098069
PCT Pub. Date: May 12, 2022

(65) Prior Publication Data
US 2023/0336899 A1 Oct. 19, 2023

(30) Foreign Application Priority Data

Nov. 4, 2020 (KR) .......................... 10-2020-0145668

(51) Int. Cl.
*H04R 3/00* (2006.01)
*H04R 1/08* (2006.01)

(52) U.S. Cl.
CPC ........... *H04R 1/08* (2013.01); *H04R 2420/07* (2013.01)

(58) Field of Classification Search
CPC ............................... H04R 1/08; H04R 2420/07
USPC .................................................... 381/92, 122
See application file for complete search history.

(56) References Cited

U.S. PATENT DOCUMENTS

2015/0325249 A1* 11/2015 Russell ................... G10L 21/02
381/122

FOREIGN PATENT DOCUMENTS

| KR | 10-2004-0106786 A | 12/2004 |
| KR | 10-0603190 B1 | 7/2006 |
| KR | 10-1206066 B1 | 11/2012 |
| KR | 10-1662689 B1 | 10/2016 |
| KR | 10-1745866 B1 | 6/2017 |

OTHER PUBLICATIONS

KR Office Action in application No. 10-2020-0145668 dated Nov. 16, 2021.

* cited by examiner

*Primary Examiner* — Ammar T Hamid
(74) *Attorney, Agent, or Firm* — Maschoff Brennan

(57) ABSTRACT

The present invention relates to a wireless communication device for a neck microphone, comprising: a body 110, which has a communication terminal device and is placed on the rear part of the neck of a user; and a neck microphone 120, which is attachably/detachably provided on the body to come into close contact with the front part of the neck, and thus transmit voice sound through the vibration of the neck, wherein the center of gravity is at the back of the neck of the user because of the weight of the body. The present invention is manufactured in an integrated form of a neck microphone and a wireless communication terminal device, and thus enables communication while both hands are free even if fire is suppressed while the facepiece respirator is worn, or even if chemical protective clothing is worn.

13 Claims, 6 Drawing Sheets

WIRELESS COMMUNICATION DEVICE FOR NECK MICROPHONE

TECHNICAL FIELD

The present invention relates to a wireless communication device for a neck microphone, and more particularly, to a wireless communication device for a neck microphone which has a neck microphone and a wireless communication terminal device integrally configured, and enables communication while both hands are free.

BACKGROUND ART

Firefighters who save lives by throwing themselves at fire sites are exposed to all kinds of dangers, and are threatened because noise makes smooth communication difficult.

In particular, firefighters inside fire sites often listen to additional information obtained from the outside to determine when to rescue or evacuate people, but often miss important information because of background noise or because they are concentrating on rescuing people.

In addition, when communicating with radio equipment at a fire site, a firefighter may be often in danger because the firefighter cannot hear the voice of his/her colleagues on site, and when a firefighter uses a facepiece respirator to suppress a fire or wear chemical protective clothing, the firefighter has difficulty in communicating because it is difficult for the firefighter to press buttons on radio equipment.

Therefore, it is important to improve the efficiency of lifesaving by enabling firefighters to communicate smoothly in disaster relief sites full of noise devices.

DISCLOSURE

Technical Problem

The present invention has been made to solve the above technical problem, and an object of the present invention provides a wireless communication device for a neck microphone which has a neck microphone and a wireless communication terminal device integrally coupled, and enables communication while both hands are free even if fire is suppressed while the facepiece respirator is worn, or even if chemical protective clothing is worn.

Technical Solution

According to the present invention, a wireless communication device for a neck microphone includes: a body, which has a communication terminal device and is placed on a rear part of a neck of a user; and a neck microphone, which is attachably/detachably provided on the body to come into close contact with a front part of the neck, and thus transmit voice sound through vibration of the neck, in which a center of gravity is at a back of the neck of the user because of a weight of the body.

The body may be formed to be bent downward to be placed according to curves of the lower part of the neck and a shoulder of the user.

The neck microphone may include a neck band unit which is inserted into the body and protrudes roundly from both ends of the body; and a neck microphone unit which is provided at an end portion of the neck band unit and contacts the neck of the user to detect the vibration of the neck.

The neck band unit may pass through a guide slot part provided on one side of the body and may be inserted into the insertion slot part.

The communication terminal device may enable a multi-party real-time call.

A lower surface of the body may be provided with a radio connection jack for connection with radio equipment.

One side surface of the body may be provided with a push to talk (PTT) button for transmitting voice sound using radio equipment.

The PTT button may protrude from one side surface of the body.

The body may include an automatic alarm mode having an automatic alarm function in the event of the emergency to the user.

The wireless communication device for a neck microphone may further include a mute button protruding from one side surface of the body.

The communication terminal device may be set with an ID, the communication terminal device may operate as a master or a slave according to ID settings, and the master may transmit a beacon signal and the slave may operate in synchronization with the beacon signal.

The ID may be selected as one of Nos. 0 to 5, shared (SH), and listen only (LO), No. 0 may be a master transmitting on voice sound channel, Nos. 1 to 5 may be slaves transmitting on voice sound channel, the SH may be a slave transmitting shared voice sound channel No. 5, and the LO may be a receive-only slave.

The ID No. 5 and the ID SH may be selected according to an operation model, and when the ID of the communication terminal device is SH, the communication terminal device whose ID is SH may be set as a slave to which a shared channel is assigned.

Advantageous Effects

According to the present invention, since a body and a neck microphone are integrally configured, there is no need for a separate wire for connecting the body and the neck microphone, so it is possible to enable free movement and easy communication under a rescue work environment such as a fire site.

In addition, according to the present invention, the neck microphone can be worn in a simple way to be inserted behind a neck, and can be worn without interference even while wearing a facepiece respirator or a firefighter hat and wearing thick chemical protective clothing.

In addition, according to the present invention, by evenly distributing a load due to a weight of a body to a lower part of a neck and a shoulder, it is possible to improve wearing comfort and stably maintain a worn state. Even if a firefighter conducts firefighting and disaster relief work while wearing a neck microphone for a long time, the neck microphone can respond flexibly without straining a human body and perform stable communication without changing a wearing position even if it does not burden the human body and takes various postures with a lot of movement.

In addition, since the present invention uses a neck microphone, it is possible to communicate smoothly in a disaster relief environment full of noise, and since the neck microphone is seated on the neck and located in a lower space of the facepiece respirator, the neck microphone can be worn without interference from the facepiece respirator.

In addition, according to the present invention, the neck microphone can perform communication through radio equipment in addition to a wireless communication function included in a device by connecting the radio equipment. In addition, according to the present invention, since the neck microphone is attachable/detachable from the body, when an abnormality occurs, it is possible to separately separate, replace, and repair only the neck microphone part, remove the neck microphone and perform communication by wearing the neck microphone elsewhere as if the neck microphone puts around an upper arm.

In addition, according to the present invention, a mute button, a PTT button, and the like are divided and protrude on both sides of the body, and thus, it is possible to press buttons quickly even while wearing thick gloves during firefighting or disaster rescue work, so the quick response is possible.

In addition, the present invention has an effect that mutual communication is possible without passing through a base station and multi-party real-time communication is possible.

According to the present invention, since the neck microphone and the wireless communication terminal device are integrally manufactured, even when the firefighting is conducted while wearing a facepiece respirator or chemical protective clothing is worn, the neck microphone can be easy to wear, can be stably maintained, and can facilitate communication between crew members even in a noisy environment.

[Description of Reference Signs]

| | |
|---|---|
| 100: Wireless communication device for a neck microphone | |
| 110: Body | 111: Guide slot part |
| 113: Insertion slot part | 120: Neck microphone |
| 121: Neck band part | 122: Neck microphone part |
| 130: Mute button | 140: PTT button |
| 150: Display unit | 161: Power supply button |
| 162: Mode button | 163, 164: Control button |
| 171: Radio connection jack | 172: USB port |
| 174: Ear set | 175: Radio equipment |
| 176: Cell phone | 180: Automatic alarm mode |
| 190: Group mode | |

BEST MODE

Hereinafter, embodiments of the present invention will be described in detail with reference to the accompanying drawings.

Figure 1:
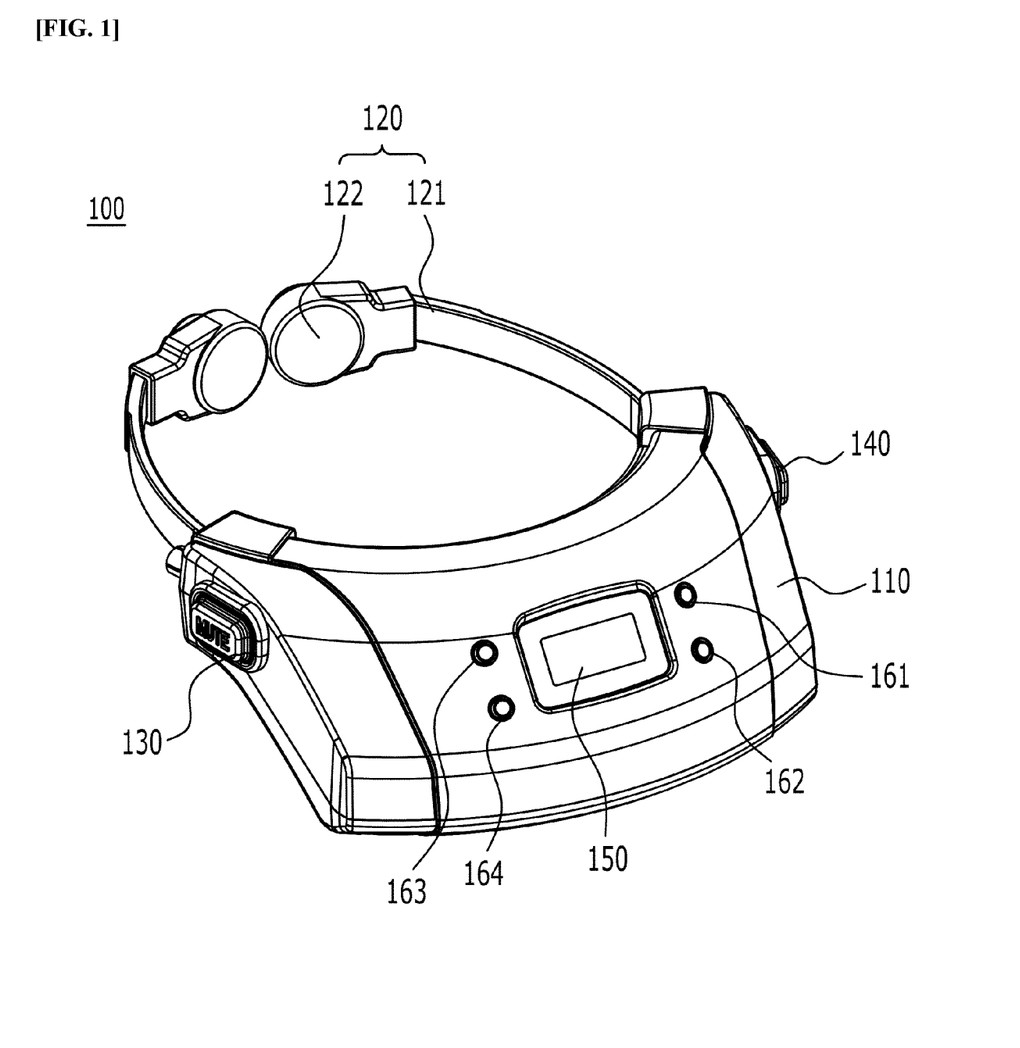
FIG. 1 is a perspective view illustrating a wireless communication device for a neck microphone according to an embodiment of the present invention from above.

FIG. 1 is a perspective view illustrating a wireless communication device for a neck microphone according to an embodiment of the present invention.

As illustrated in FIG. 1, a wireless communication device 100 for a neck microphone of the present invention is used by being hooked on a neck of a user, and includes a body 110 placed on a rear part of the neck of the user, a body 110 placed on a rear part of the neck of the user, and a neck microphone 120 in close contact with a front part of the neck. Users include firefighters, rescue workers, and the like who rescue people at firefighting sites or disaster sites. An example of a state in which the user is wearing the wireless communication device 100 for a neck microphone will be described with reference to FIG. 5.

The body 110 includes various devices for operating the wireless communication device 100 for a neck microphone. The body 110 is hooked on the rear part of the neck of the user to support the neck microphone 120.

Due to the weight of the body 110, the wireless communication device 100 for a neck microphone is at the back of the neck of the user, and the body 110 is formed to be bent downward so that the center of gravity is below the back of the neck of the user. When the center of gravity of the body 110 goes downward behind the neck of the user, the load caused by the weight of the body 110 is distributed to the lower part of the neck of the user and the shoulder, so the weight is not felt, the wearing comfort is improved, and it does not burden the neck.

In the embodiment, the body 110 has a predetermined volume, an upper surface of the body 110 is formed in a streamlined shape and a lower surface thereof is formed roundly. The lower surface of the body 110 is placed according to the curves of the lower part of the neck of the user and the shoulder, and is in contact with the lower part of the neck of the user and the shoulder. Specifically, the bottom surface of the body 110 is formed to be bent downward in close contact with the curves of the lower part of the neck of the user and the shoulder. The shape of the body 110 described above improves the wearing comfort of the wireless communication device 100 for a neck microphone by evenly distributing the load due to the weight of the body 110 over a wide area.

The neck microphone 120 is provided to protrude from both ends of the body 110. The neck microphone 120 facilitates communication between users. The neck microphone 120 transmits voice sound by vibration of the neck. The neck microphone 120 is a device that detects a vibration signal caused by vibration of vocal cords and converts the vibration signal into a voice sound signal. Since the vibration of the vocal cords is directly detected from a skin, not only may small voice sound be transmitted clearly, but it can also be accurately transmitted with a small voice even in a place with severe surrounding noise, so external noise is fundamentally blocked. Since firefighters and rescue workers use a facepiece respirator, the usefulness of using the neck microphone is increased compared to other types of microphones.

The neck microphone 120 is attachably/detachably coupled to the body 110 and integrally formed with the body 110 When the neck microphone 120 and the body 110 are integrated, a separate line is not required to connect the neck microphone 120 and the body 110, enabling stable communication even at fire sites where it is difficult to secure a field of view. The electrical connection between the neck microphone 120 and the body 110 may be made inside the body 110, which is a part where the neck microphone 120 is coupled to the body 110.

The wireless communication device 100 for a neck microphone in which the neck microphone 120 and the body 110 are integrated is formed in a ring shape with an opened front. The wireless communication device 100 for a neck microphone is worn by being hooked on the neck so that the body 110 is positioned behind the neck of the user and the neck microphone 120 is positioned in front of the neck of the user.

The neck microphone 120 is integrated with the body 110, but is attachable/detachable from the body 110. Since the neck microphone 120 is attachable/detachable from the body 110, when an abnormality occurs in the neck microphone 120, only the neck microphone 120 part may be separately separated, replaced, and repaired. The neck microphone 120 is elastically fitted into the body 110, protrudes roundly from both ends of the body 110, and is adjustable in length.

Meanwhile, it is also possible to perform wireless communication by removing the neck microphone 120 from the body 110 and attaching the neck microphone 120 to a user's upper arm by combining an elastic band instead of the neck microphone 120. In this case, it is possible to transmit voice sound by connecting a different type of microphone to the body 110 instead of the neck microphone 120.

The neck microphone 120 is divided into a neck band unit 121 and a neck microphone unit 122. The neck band unit 121 is fitted into the body 110 and is adjustable in length. The neck microphone unit 122 is provided on an end portion of the neck band unit 121. The length of the neck band unit 121 is adjusted so that the neck microphone 120 is adjusted to the user's size to improve the wearing comfort, and the neck microphone unit 122 improves the sensitivity of detecting the vibration of the vocal cords.

In the embodiment, the neck microphone 120 has a neck band unit 121 that protrudes roundly from both ends of the body 110 and is adjustable in length. When the neck microphone 120 is not in use, the neck band unit 121 is inserted into the body 110, and when the neck microphone 120 is in use, the length of the neck microphone 120 may extend by withdrawing the neck band unit 121 from the inside of the body 110. The neck band unit 121 has elasticity, and thus, the neck microphone unit 122 may be closely attached to the neck of the user.

The neck microphone unit 122 of the end portion of the neck microphone 120 may have a tubular structure and contact the neck of the user and detect the vibration of the neck. The neck microphone unit 122 converts the vibration signal according to the vibration of the vocal cords into the voice sound signal.

The structure in which the neck microphone unit 122 is in contact with the neck of the user and the body 110 is placed on the lower part of the neck of the user prevents interference with the facepiece respirator (reference numeral 10 in FIG. 5) worn on the user's face. At a fire site, firefighters wear the facepiece respirator to protect their faces, and as the firefighters wear the facepiece respirator, it is difficult to mount communication devices and microphones. However, the neck microphone unit 122 is located in the space below the facepiece respirator and detects the vibration signal according to the vibration of the vocal cords and transmits the voice sound, so firefighters may communicate smoothly with each other. Therefore, it is possible to wear the wireless communication device 100 for a neck microphone and perform communication even while wearing the facepiece respirator.

As the body 110 is also located in the space below the firefighter hat (reference numeral 20 in FIG. 5), the wireless communication device 100 for a neck microphone in which the body 110 and the neck microphone 120 are combined may be worn easily even while the user wears the firefighter hat and facepiece respirator.

The neck microphone unit 122 may be configured to include a sound absorbing plate capable of collecting vibration signals in a housing forming a space of a tubular structure, a microphone that converts the vibration signal collected through the sound absorption plate into an electrical signal, a sound absorbing member that is inserted into a resonator formed between the microphone and the housing to remove standing waves, and a buffer member that is made of silicon disposed between the housing and the sound absorbing plate. In the embodiment, in the neck microphone unit 122, for example, the performance of the microphone is 470 KΩ and −56 dB, and the performance of the speaker is 32Ω and 96 dB.

The body 110 includes a mute button 130 and a push to talk (PTT) button 140.

The mute button 130 and the PTT button 140 are provided on one side surface and the other side surface of the body 110, respectively, and protrude in predetermined portions, so a user may easily press the buttons without looking directly while wearing. In the embodiment, when the description is based on the state worn by the user, the mute button 130 is provided on the left side and the PTT button 140 is provided on the right side. By separately arranging the buttons on both sides, it prevents the user from making the mistake of wrongly pressing the buttons. In addition, the mute button 130 and the PTT button 140 have a predetermined size so the user may easily press the buttons even while wearing thick gloves.

The mute button 130 is a sound removal button. The mute button 130 serves to prevent the sound of the user from being heard by the other party. When the mute button 130 is pressed once, the sound of the user is not heard by the other party, and when the mute button 130 is pressed once again in this state, the mute button 130 returns to the original state. Since the embodiment of the present invention includes a communication terminal device capable of multi-party calls in real time, when a user enters a noisy space, the noise is transmitted to other users as it is, which may cause a problem. Therefore, by using the mute button 130, if necessary, the function of preventing the sound of the user from being transmitted to the other party may be operated usefully.

The PTT button 140 is a button capable of communicating with the radio equipment in the pressed state, and is a button capable of transmitting the voice sound using the radio equipment. The radio equipment, also called a walkie-talkie, is a communication device that has been used by soldiers and rescuers in the past, and to transmit the voice sound of the soldier or rescue worker, the radio equipment should speak while pressing the PTT button. The radio equipment may be connected to the body 110 using a separate jack, and the PTT button 140 is for transmitting the voice sound to the connected radio equipment. That is, The PTT button 140 is a button made to enable the voice sound communication through the radio equipment by pressing the PTT button 140 when talking and releasing the PTT button 140 when listening as a basic communication method of the radio equipment.

The wireless communication device 100 for a neck microphone enables multi-party calls between firefighters conducting rescue operations, but there are cases in which specific personnel, such as a commander, uses the existing radio equipment without using the wireless communication device 100 for a neck microphone during the rescue operations to conduct the direction of work. The wireless communication device 100 for a neck microphone may connect the radio equipment, and thus, may hear the voice sound received by the radio equipment together with the voice sound received using the communication terminal device of the wireless communication device 100 for a neck microphone and may also enable a user to transmit the voice sound through the radio equipment connected using the PTT button 140.

The body 110 includes a display unit 150, a power button 161, a mode button 162, and control buttons 163 and 164. The display unit 150 displays various types of information input to the body 110 or displays various setting values set in the body 110, so the user may check the information and various setting values. The display unit 150 is provided on the upper surface of the body 110. The power button 161, the mode button 162, and the control buttons 163 and 164 may be provided around the display unit 150.

The power button 161 is responsible for the on/off function of the body 110. The power button 161 turns off the power when the wireless communication device 100 for a neck microphone is not in use. The body 110 may be provided with a lithium ion battery to supply power. In the embodiment, the lithium ion battery is 3.7V, 1350 mA and may be used continuously for about 10 hours. The lithium-ion battery may be used as a rechargeable type. When the power button 161 is pressed long for 2 seconds or longer, the power is turned off, and when the power button 161 is pressed long for 2 seconds or longer again in the power off state, the power supply may be turned on.

The body 110 uses a radio frequency band of 925.5 MHz to 937.05 MHz, and the number of used frequencies may be in plurality. The number of used frequencies may be 36 channels. The wireless communication may be performed by selecting the channels among 36 channels. In the embodiment, the size of the body 110 is approximately 85×145×28 mm, and the weight is about 250 g. The communication distance is about 1,000 m (based on LOS), and when connected to the radio equipment, the communication is possible up to 6 km. In addition, the body 110 is capable of, for example, 6-person many-to-many real-time call and can communicate with multi parties simultaneously by transmitting the voice sound. In addition, encrypted communication of conversation contents between communication groups is possible. This may be performed by setting in the body 110.

A frequency channel to be used may be selected by pressing the mode button 162 provided on the upper surface of the body 110, and encryption between groups by selecting the same channel is also possible. The mode button 162 is for a channel, an ID, a volume, a microphone input level, a wireless alarm view change and setting, and the like.

The body 110 has a noise removal function. For example, by setting a call to be implemented at 100 dB or more, ambient noise may be blocked and unnecessary noise may be reduced.

The body 110 is a device capable of making multi-party calls as described above, and may perform the voice sound communication using the radio equipment in parallel by connecting the radio equipment separately. As described above, the PTT button 140 is a button that may be used as needed during the radio equipment communication.

The control buttons 163 and 164 may adjust the communication volume between users. The control buttons 163 and 164 include an up button 163 and a down button 164. The up button 163 may increase setting values in each mode, such as a volume, a channel, and an ID. The down button 164 may decrease the setting values in each mode, such as a volume, a channel, and an ID. The control buttons 163 and 164 are illustrated as being provided on the upper surface of the body 110, but may be provided in other locations that are easy for the user to manipulate. The body 110 can be interlocked by connecting a mobile phone and interlocked by connecting the radio equipment.

Figure 2:
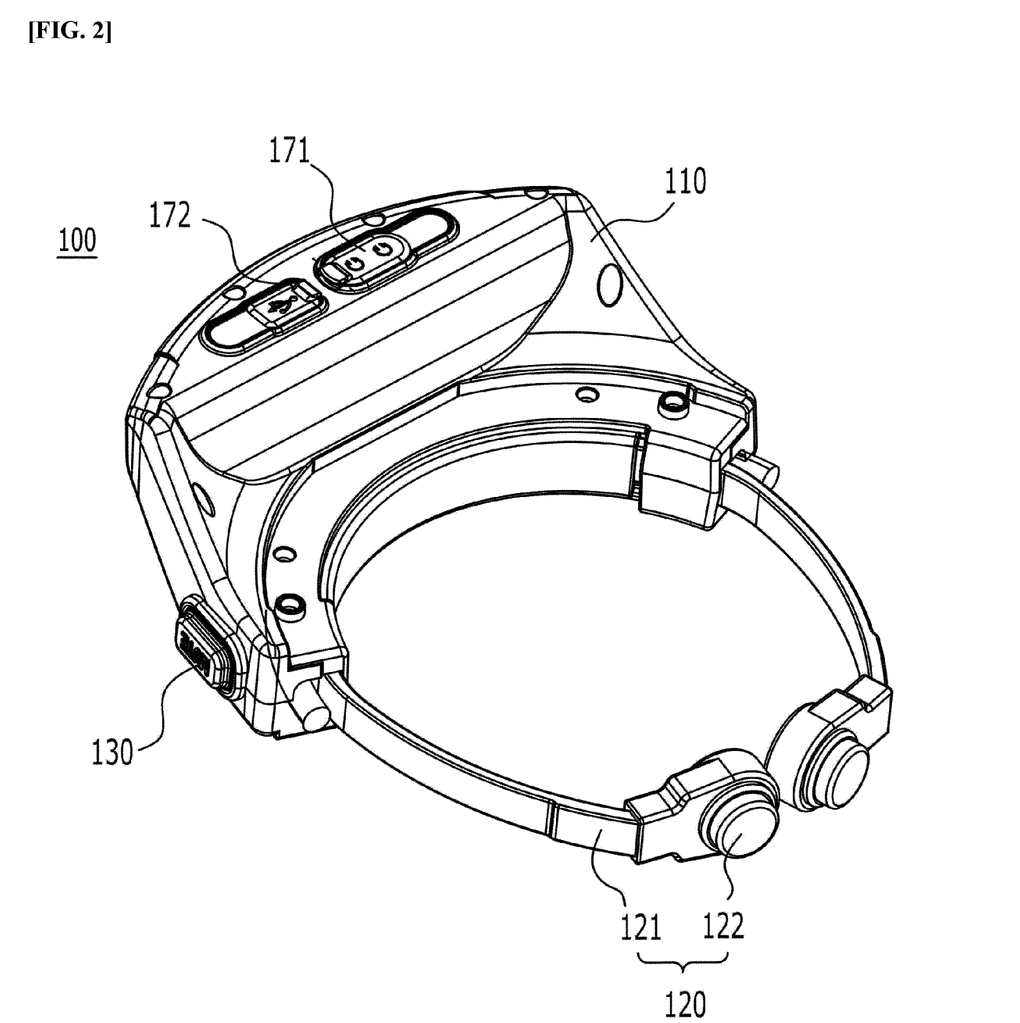
FIG. 2 is a perspective view illustrating the wireless communication device for a neck microphone according to an embodiment of the present invention from below.

FIG. 2 is a perspective view illustrating the wireless communication device for a neck microphone according to an embodiment of the present invention from below.

As illustrated in FIG. 2, the lower surface of the wireless communication device 100 for a neck microphone is inclined downward and is rounded. The lower surface of the body 110 is placed according to the curves of the lower part of the neck of the user and the shoulder, and is in contact with the lower part of the neck of the user and the shoulder, thereby providing the wearing comfort.

A radio connection jack 171 for connecting the radio equipment is provided at the front end side of the lower surface of the body 110. The radio equipment may be connected to the radio connection jack 171. When the cover illustrated in the drawing is opened, a jack that may be connected to the radio equipment is exposed, and a cable extending from the radio equipment may be connected to the jack.

By connecting and interlocking the radio equipment to the body 110, it is possible to perform communication with surrounding users using the wireless communication device for a neck microphone by using the communication terminal device provided in the body 110, and communicate with the command and control center through radio equipment.

In addition, the radio connection jack 171 may be provided with an ear set jack capable of connecting an ear set such as an earphone or a headset in addition to the jack for connecting the radio equipment. By connecting an earphone to the ear set jack, a user may listen to the communication voice sound through the earphone. Meanwhile, the earphone may extend from the neck microphone 120 and be integrally provided with the neck microphone 120, or may be a wireless earphone connected to the body 110 through wireless communication such as Bluetooth communication. In the case of the wireless earphone, since the wireless earphone can be worn on a user's ear without a separate cable, convenience in use may be increased in a rescue work environment.

In addition, a USB port 172 for charging and wired use is provided at the front end side of the lower surface of the body 110. A battery provided in the body 110 may be charged by connecting a charging cable to the USB port 172. Alternatively, by connecting other communication devices such as the radio equipment to the USB port 172, the body 110 is interlocked, enabling individual communication with the command and control room. In addition, a portable terminal such as a mobile phone may be connected to the USB port 172 to be interlocked.

Since the radio connection jack 171 and the USB port 172 are provided on the front end side of the lower surface of the body 110, the cable connecting the radio connection jack 171 and the USB port 172 is located behind a user's back. When the cable is connected to the radio connection jack 171 and the USB port 172 while wearing the radio equipment or a cell phone on a user's waist, the cable does not interfere with the user, so the user's movement is free.

In the embodiment, the radio connection jack 171 and the USB port 172 are located so that users performing tasks in the environment with a lot of movement and the hazardous environment can perform communication freely without being constrained by dangling cables or the like.

The body 110 and the neck microphone 120 are subjected to waterproof processing. The waterproof processing of the body 110 and the neck microphone 120 may block the inflow of water from the outside to transmit a clear voice sound signal, and block the inflow of water into a gap between the mute button or the PTT button, thereby protecting the internal switch or internal circuit of the body 110.

In addition, the body 110 and the neck microphone 120 are formed of a flame retardant material to prevent ignition or combustion due to high heat, thereby preventing communication between users from being cut off.

The body 110 and the neck microphone 120 may have luminous epoxy applied to the outer circumferential surfaces or luminous tape attached to the outer circumferential surfaces so as to have night visibility. This makes it easy to identify locations between users (firefighters or rescuers) in a firefighting or disaster rescue situation.

Figure 3:
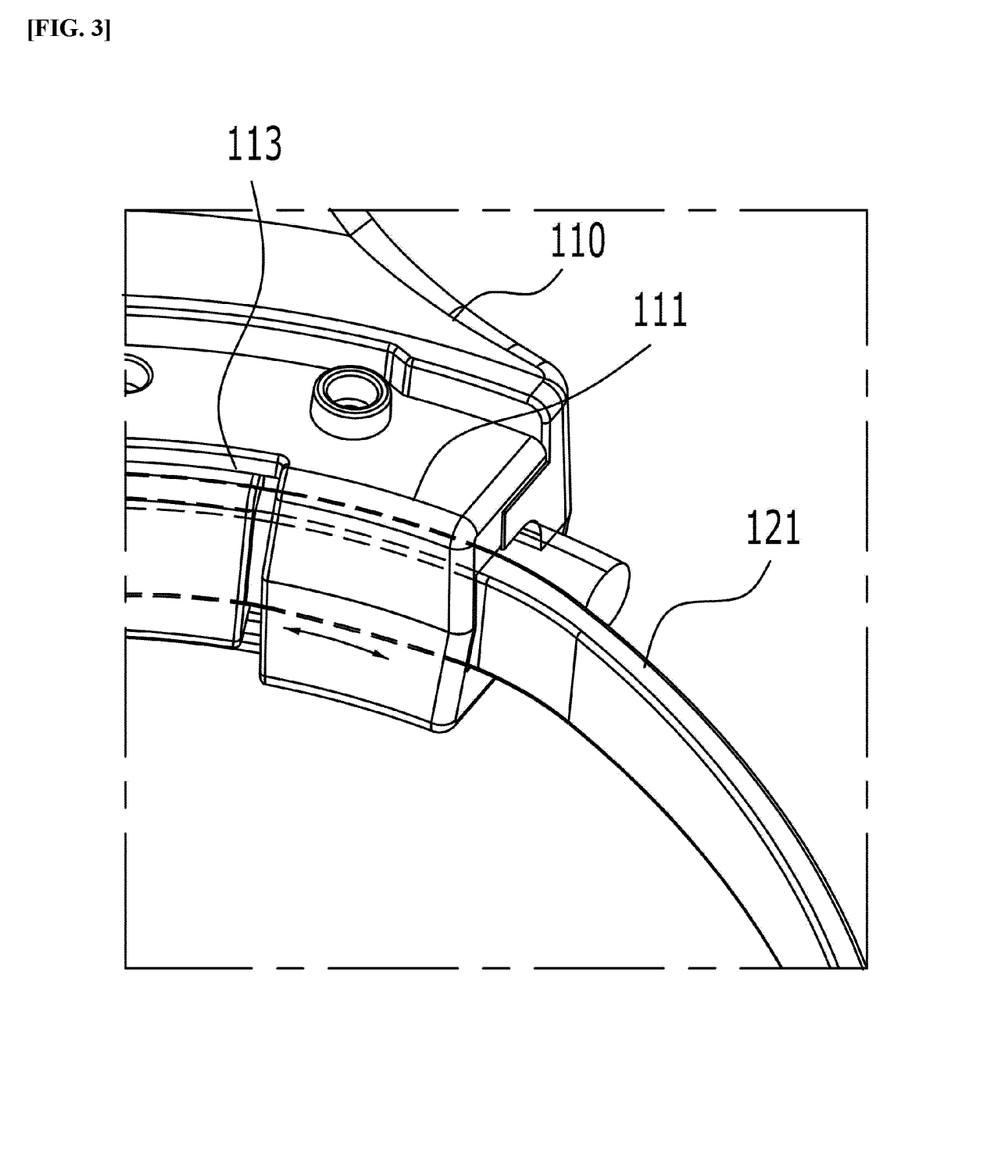
FIG. 3 is a diagram for describing a configuration for adjusting a length of a neck microphone in the wireless communication device for a neck microphone according to an embodiment of the present invention.

FIG. 3 is a diagram for describing a configuration for adjusting a length of a neck microphone in the wireless communication device for a neck microphone according to an embodiment of the present invention.

As illustrated in FIG. 3, the length of the neck microphone 120 can be adjusted in a manner in which the neck band unit 121 is inserted into the insertion slot part 113 through the guide slot part 111 provided at the rear end side, which is one side of the body 110, and is withdrawn. The neck band unit 121 is inserted into the insertion slot part 113 and moved to adjust the length.

The neck band unit 121 is inserted into the insertion slot part 113 in a rail manner, and has a hooked structure in the inserted state and is adjustable in length. The length adjustment structure of the neck band unit 121 may employ the known headset length adjustment structure.

Figure 4:
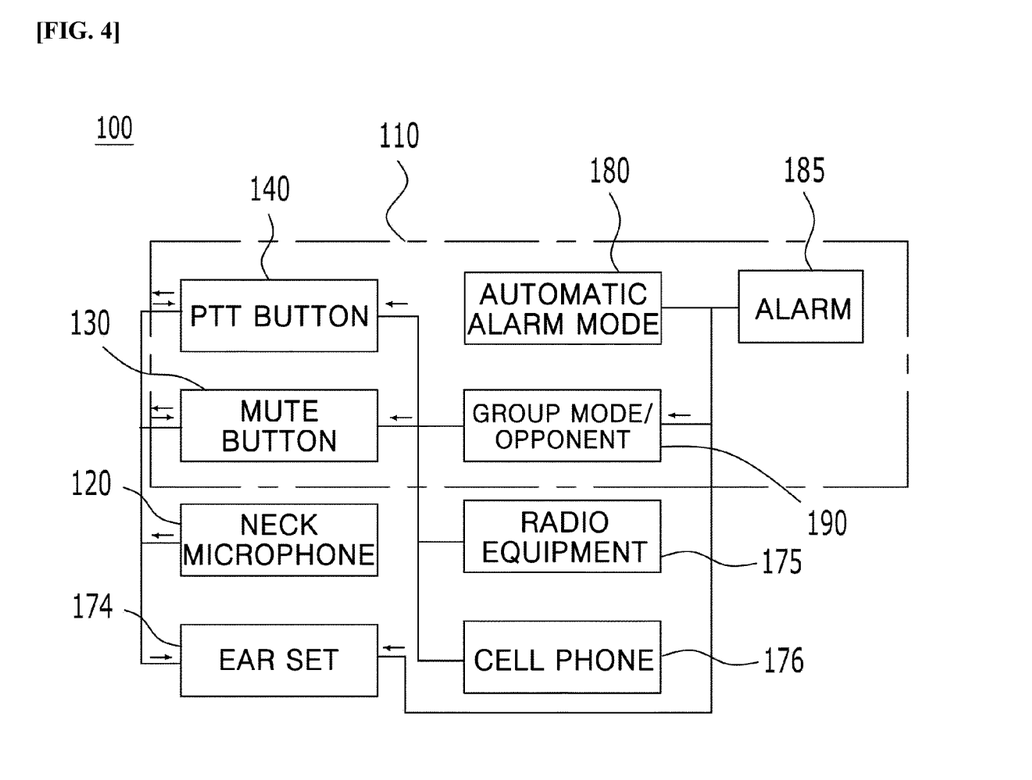
FIG. 4 is a configuration diagram for describing an operation of a body according to an embodiment of the present invention.

FIG. 4 is a configuration diagram for describing an operation of a body according to an embodiment of the present invention.

As illustrated in FIG. 4, a user may transmit his or her own voice sound in an operation order of the neck microphone 120—mute button 130/PTT button 140—group mode/other party 190, radio equipment 175, cell phone 176. That is, the user may transmit his/her own voice sound to the neck microphone—mute button—group mode or to the neck microphone—mute button—the other party. Alternatively, the user may transmit his/her own voice sound to the neck microphone—PTT button—radio equipment. In the embodiment, the "group mode" is to make a multi-party call, and "the other party" is to make a call with a specific other party and can be set by the user's selection.

In addition, the user may receive the voice sound of the other party in the operation order of the group mode/the other party 190, the radio equipment 175, the cell phone 176—the mute button 130/PTT button 140—the ear set 174. Normally, when receiving the voice sound, the mute button/PTT button does not work, so the user may receive the voice sound of the other party through the group mode-ear set or through the other party-ear set.

The body 110 may include an automatic alarm mode 180 that can be adjusted or released in units of set time. The automatic alarm mode 180 has an automatic alarm function in the event of the emergency to the user (rescuer or firefighter). The automatic alarm mode 180 may be set to automatically alarm in units of several seconds.

For example, the automatic alarm mode 180 may automatically alarm the user in units of 30 seconds in the event of the emergency to the user. The automatic alarm mode 180 may release its function. The automatic alarm mode 180 may be executed by the user directly pressing an alarm button, or may be executed by detecting a signal of a specific part of the user's body by a sensor wired or wirelessly connected to the body 110. For example, the automatic alarm mode 180 may sense and automatically alarm when a user's body temperature is lowered below a set temperature when there is no movement of the user or when a pulse rate is not beating. To this end, the body 110 includes an alarm 185.

The body 110 has a communication terminal device (not illustrated) enabling the multi-party real-time call. The communication terminal device of the embodiment enables the multi-party real-time call between users wearing the wireless communication device 100 for a neck microphone without going through a base station. In addition to this, the body 110 includes an interface for connecting various devices and necessary electronic circuits.

This communication terminal device includes the group mode 190. In the group mode 190, several people communicate with each other while sharing one frequency channel. The group mode 190 can be encrypted. The automatic alarm mode 180 may transmit an alarm sound to the channel of the group mode 190 in the event of the emergency to the user.

In the above-described embodiment of the present invention, listening to the other party's voice sound through the ear set has been described as an example, but by including the speaker unit in the body 110, it is possible to receive the other party's voice sound through the speaker unit provided in the body 110 without using the ear set as needed.

Figure 5:
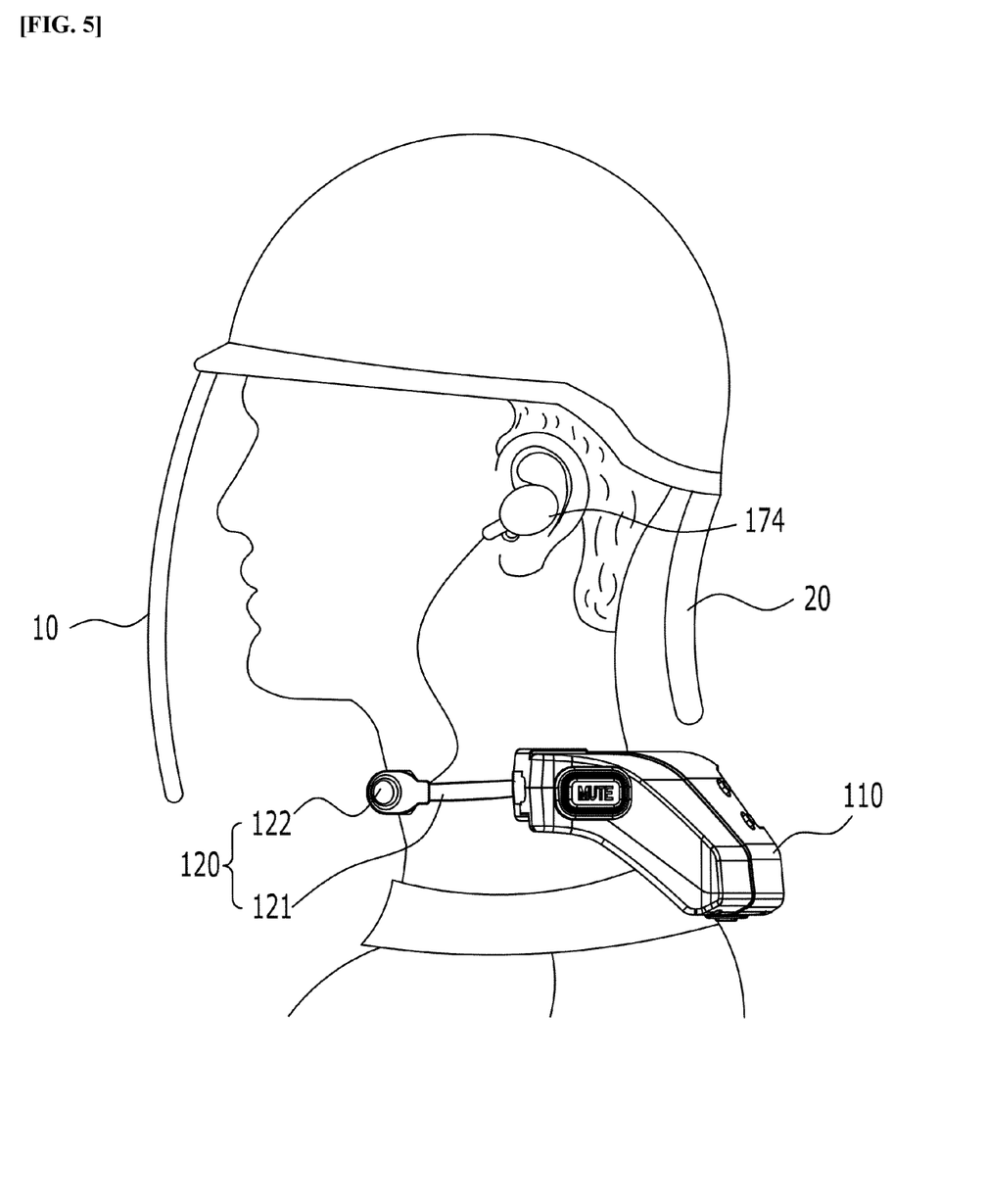
FIG. 5 is a diagram illustrating a state in which the wireless communication device for a neck microphone according to an embodiment of the present invention is worn.

FIG. 5 is a diagram illustrating a state in which the wireless communication device for a neck microphone according to an embodiment of the present invention is worn.

As illustrated in FIG. 5, the wireless communication device 100 for a neck microphone is worn by inserting from the back of the neck to the front of the neck. When the wireless communication device 100 for the neck microphone is worn while wearing the facepiece respirator 10 and the firefighter hat 20, the neck microphone unit 122 is in contact with the neck of the user, and the body 110 is placed on the rear part of the neck of the user and thus does not interfere with the facepiece respirator 10 or the firefighter hat 20.

That is, the neck microphone unit 122 is located in the space below the facepiece respirator 10, and the body 110 is stably placed on the rear part of the neck without interfering with the firefighter hat 20, and thus, may wear the wireless communication device 100 for a neck microphone even while wearing the facepiece respirator 10, and does not interfere with the facepiece respirator 10 or the firefighter hat 20, so the smooth communication is possible while stably maintaining the wearing state of the communication terminal device. In addition, the ear set 174 may be provided at a distance close to an ear, so it is easy to wear on the user's ear.

Figure 6:
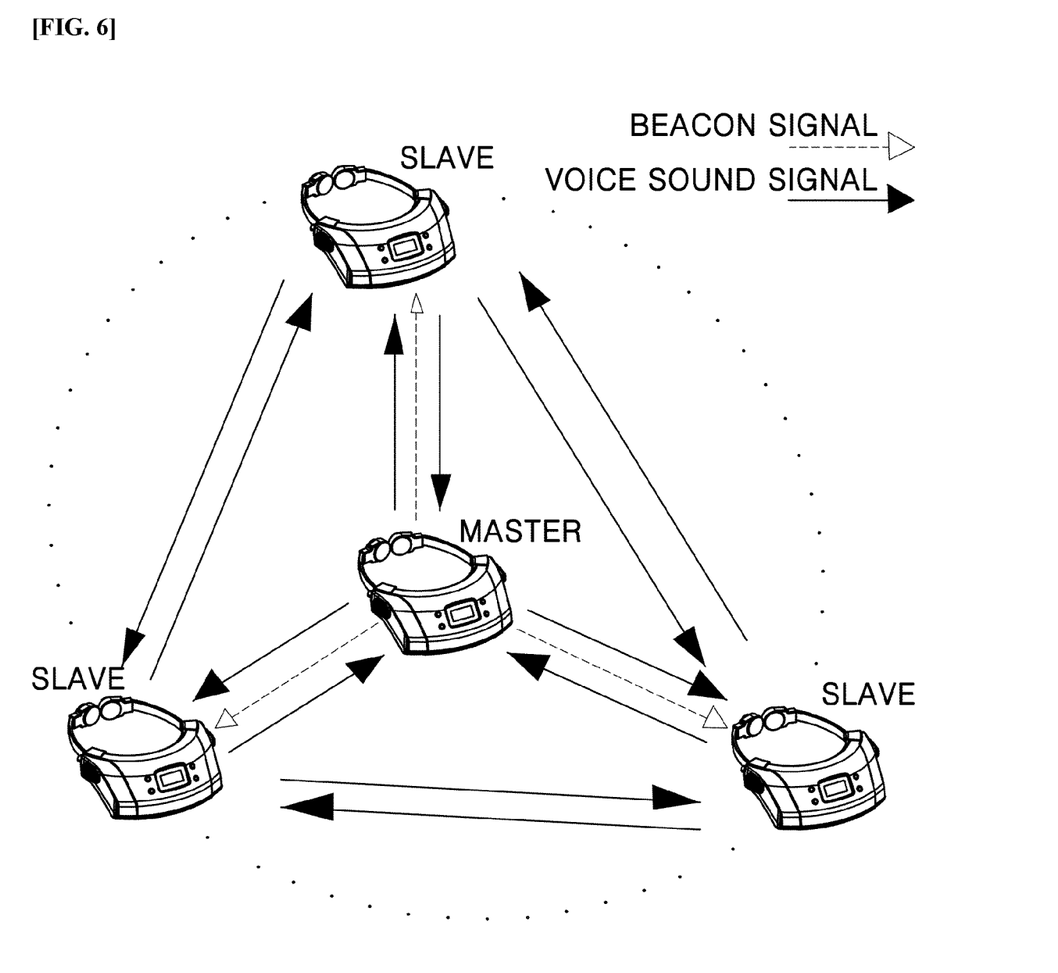
FIG. 6 is a configuration diagram for describing a method of enabling multi-party real-time communication using the wireless communication device for a neck microphone according to an embodiment of the present invention.

FIG. 6 is a configuration diagram for describing a method of enabling multi-party real-time communication using the wireless communication device for a neck microphone according to an embodiment of the present invention.

As illustrated in FIG. 6, one ID is set for each wireless communication device 100 for a neck microphone. The wireless communication device 100 for a neck microphone may operate as a master or slave according to the ID setting of the terminal (communication terminal device). For the group communication, the master transmits a beacon signal, and the slave may operate in synchronization with the beacon signal.

One wireless communication device 100 for a neck microphone may simultaneously receive up to 6 channels of voice sound. For example, voice sound channel Nos. 0 to 4 are assigned to terminals corresponding to IDs, and channel No. 5 may be shared and used or assigned to terminal No. 5 according to an operation model.

The voice sound wirelessly transmitted from each terminal receives up to six voice sounds at the same time, and the received voice sounds are mixed in the terminal and heard as the final voice sound. According to the settings, an alarm signal is transmitted wirelessly when there is no movement of the terminal, and terminals in the group may hear the alarm voice sound.

Specifically, the operation model using the wireless communication device 100 for a neck microphone may be implemented as a real-time communication operation model A between one group and an operation model B capable of communicating not only between one group but also between other groups.

Table 1 below shows the operation model A.

TABLE 1

| ID | Master/slave | Voice sound channel | Alarm function |
| --- | --- | --- | --- |
| 0 | Master | Voice sound channel No. 0 Transmission | Wireless alarm transmission function |
| 1 | Slave | Voice sound channel No. 1 Transmission | Wireless alarm transmission function |
| 2 | Slave | Voice sound channel No. 2 Transmission | Wireless alarm transmission function |
| 3 | Slave | Voice sound channel No. 3 Transmission | Wireless alarm transmission function |
| 4 | Slave | Voice sound channel No. 4 Transmission | Wireless alarm transmission function |
| 5 | Slave | Voice sound channel No. 5 Transmission | Wireless alarm transmission function |
| LO | Slave | Receive-only | No wireless alarm transmission function |

The operation model A operates by assigning terminal IDs as 0, 1, 2, 3, 4, 5, and listen only (LO). Terminal No. 0 in Table 1 operates as the master as illustrated in FIG. 6. The master is unique within the group. The remaining terminals operate as the slave. Terminal Nos. 0 to 5 use a fixed voice sound channel. A terminal set to the LO is a receive-only terminal. A plurality of LO terminals may exist in a group. ID Nos. 0 to 5 do not overlap each other within the group.

Table 2 below shows the operation model B.

TABLE 2

| ID | Master/slave | Voice sound channel | Alarm function |
| --- | --- | --- | --- |
| 0 | Master | Voice sound channel No. 0 Transmission | Wireless alarm transmission function |
| 1 | Slave | Voice sound channel No. 1 Transmission | Wireless alarm transmission function |
| 2 | Slave | Voice sound channel No. 2 Transmission | Wireless alarm transmission function |
| 3 | Slave | Voice sound channel No. 3 Transmission | Wireless alarm transmission function |
| 4 | Slave | Voice sound channel No. 4 Transmission | Wireless alarm transmission function |
| SH | Slave | Voice sound channel No. 5 Transmission | No wireless alarm transmission function |
| LO | Slave | Receive-only | No wireless alarm transmission function |

The operation model B operates by assigning terminal IDs as 0, 1, 2, 3, 4, the shared (SH), and the listen only (LO). Terminal No. 0 in Table 2 operates as the master as illustrated in FIG. 6. The remaining terminals operate as the slave. Terminal Nos. 0 to 4 use the fixed voice sound channel. The SH shares and uses the voice sound channel with other SH terminals. Multiple SHs may be set within a group. Since a plurality of SH terminals may exist between groups, the SH terminal may transmit when other SH terminals do not transmit. The SH terminal transmits the voice sound only while pressing the mute button 130. The terminal set to the LO is the receive-only terminal. The plurality of LO terminals may exist in a group.

The SH terminal may transmit between groups and share a voice sound channel within a group to which the SH terminal belongs.

The operation mode of the wireless communication device 100 for a neck microphone may be divided into a normal mode and a setting mode. A default mode of the wireless communication device 100 for a neck microphone is a normal mode when the power is turned on.

When the mode button 162 is pressed short in the normal mode, selection keys are displayed on the display unit 150 in the order of CH—ID—sidetone ON/OFF—microphone gain—wireless alarm transmission setting—neck microphone EQ ON/OFF, and in order to change the setting values such as the channel and ID, the mode button 162 is pressed long while the corresponding selection key is displayed on the display unit 150 and changes to the setting mode.

The volume adjustment may be adjusted to the desired volume by pressing the up button 163 and the channel setting changes to the setting mode by pressing long the mode button 162 while the CH selection key is displayed on the display unit 150, and then may be set by pressing the up button 163 and the down button 164. When the channel is set, the mode button 162 may be long pressed again to complete the channel setting.

The ID setting changes to the setting mode by pressing long the mode button 162 while the ID selection key is displayed on the display unit 150, and then the desired ID may be set by pressing the up button 163 and the down button 164.

The ID can be set to one of Nos. 0 to 5, SH, and LO. When the ID is No. 0, the ID is set as the master. The master should be unique within the group. When the ID is Nos. 1 to 5, a fixed channel is assigned and each ID is set as a slave. No. 5 is set only in the case of the operation model A.

When the ID is the SH, the ID is set as a slave to which a shared channel is assigned. Several SHs may be set between groups, and may only be set for the operation model B. When the ID is the LO, the ID is set as the receive-only slave. Several terminals in the group may be set as the LO. When the ID is set, the mode button 162 may be long pressed again to complete the ID setting.

The side tone ON/OFF setting, the microphone gain setting, the wireless alarm transmission setting, and the neck microphone EQ ON/OFF setting may also be performed by pressing the mode button 162, the up button 163, and the down button 164 in the method as described above.

In the case of the wireless alarm transmission setting, it can be set to one of EF, E0, E1, E2, or E3. In the case of EF, the wireless alarm transmission function may be turned off, in the case of E0, when there is no movement for 30 seconds, an alarm may be transmitted and an alarm sound may be generated, in the case of E1, when there is no movement for 1 minute, an alarm may be transmitted and an alarm sound may be generated, in the case of E2, when there is no movement for 1 minute and 30 seconds, an alarm may be transmitted and an alarm sound may be generated, and in the case of E3, when there is no movement for 2 minutes, an alarm may be transmitted and an alarm sound may be generated.

Hereinafter, the operation of the wireless communication device for a neck microphone of the present invention will be described.

In the wireless communication device 100 for a neck microphone according to an embodiment of the present invention, the body 110 and the neck microphone 120 are integrally coupled. This eliminates the need for a separate line for connecting the body 110 and the neck microphone 120, enabling firefighters to move freely and communicate easily in the rescue work environment such as a fire site.

In addition, the wireless communication device 100 for a neck microphone according to an embodiment of the present invention evenly distributes the load due to the weight of the body 110 to the lower neck part and the shoulder, thereby improving the wearing comfort and stably maintaining the wearing state. This means that even if the wireless communication device 100 for a neck microphone is worn for a long time and firefighting and disaster relief work is carried out, it does not burden the human body, and even if it takes various postures with a lot of movement, it flexibly responds to the human body and enables stable communication without changing the wearing position.

In addition, since the wireless communication device 100 for a neck microphone according to an embodiment of the present invention uses the neck microphone 120 that transmits the voice sound by the vibration of the neck, it is possible to communicate smoothly in the disaster relief environment full of noise, and the neck microphone 120 is placed on the lower part of the neck and located in the lower space of the facepiece respirator, and thus, may be worn without interference from the facepiece respirator.

In addition, in the wireless communication device 100 for a neck microphone according to an embodiment of the present invention, since the neck microphone 120 is attachable/detachable from the body 110, when an abnormality occurs, only the neck microphone 120 can be separately separated, replaced and repaired, and may perform the communication by removing the neck microphone and wearing the neck microphone elsewhere, as if the neck microphone puts on the upper arm.

In addition, the wireless communication device 100 for a neck microphone according to an embodiment of the present invention connects the radio equipment to enable communication through the radio equipment in addition to the wireless communication function included in the device. In the wireless communication device 100 for a neck microphone according to an embodiment of the present invention, the mute button 130 and the PTT button 140 are separated and protrudes on both sides of the body 110, so it is possible to quickly press the button even while wearing thick gloves during the firefighting or disaster relief work, thereby enabling the quick response.

In addition, the wireless communication device 100 for a neck microphone according to an embodiment of the present invention can communicate with each other without going through a base station, and the multi-party real-time communication is possible.

According to the present invention, since the neck microphone and the wireless communication terminal device are integrally manufactured, even when the firefighting is conducted while wearing a facepiece respirator or chemical protective clothing is worn, the neck microphone can be easy to wear, can be stably maintained, and can facilitate communication between crew members even in a noisy environment.

The best embodiments of the present invention have been disclosed in the drawings and specifications. In the present specification, although specific terms have been used, they are used only in order to describe the present invention and are not used in order to limit the meaning or the scope of the present invention, which is disclosed in the appended claims. Therefore, it will be understood by those skilled in the art that various modifications and equivalent other embodiments of the present invention are possible therefrom. Accordingly, the true technical protection scope of the present invention should be defined by the technical idea of the appended claims.

The invention claimed is:

1. A wireless communication device for a neck microphone, comprising:
   a body, which has a communication terminal device and is placed on a rear part of a neck of a user; and
   a neck microphone, which is attachably/detachably provided on the body to come into close contact with a front part of the neck, and thus transmit voice sound through vibration of the neck,
   wherein a center of gravity is at a back of the neck of the user because of a weight of the body.

2. The wireless communication device for a neck microphone of claim 1, wherein the body is formed to be bent downward to be placed according to curves of the lower part of the neck and a shoulder of the user.

3. The wireless communication device for a neck microphone of claim 1, wherein the neck microphone includes:
   a neck band unit which is inserted into the body and protrudes roundly from both ends of the body; and
   a neck microphone unit which is provided at an end portion of the neck band unit and contacts the neck of the user to detect the vibration of the neck.

4. The wireless communication device for a neck microphone of claim 3, wherein the neck band unit passes through a guide slot part provided on one side of the body and is inserted into the insertion slot part.

5. The wireless communication device for a neck microphone of claim 1, wherein the communication terminal device enables a multi-party real-time call.

6. The wireless communication device for a neck microphone of claim 1, wherein a lower surface of the body is provided with a radio connection jack for connection with radio equipment.

7. The wireless communication device for a neck microphone of claim 5, wherein one side surface of the body is provided with a push to talk (PTT) button for transmitting voice sound using radio equipment.

8. The wireless communication device for a neck microphone of claim 1, wherein the PTT button protrudes from one side surface of the body.

9. The wireless communication device for a neck microphone of claim 1, wherein the body includes an automatic alarm mode having an automatic alarm function in the event of the emergency to the user.

10. The wireless communication device for a neck microphone of claim 1, further comprising a mute button protruding from one side surface of the body.

11. The wireless communication device for a neck microphone of claim 1, wherein the communication terminal device is set with an ID,
   the communication terminal device operates as a master or a slave according to ID settings, and
   the master transmits a beacon signal and the slave operates in synchronization with the beacon signal.

12. The wireless communication device for a neck microphone of claim 11, wherein the ID is selected as one of Nos. 0 to 5, shared (SH), and listen only (LO),
   No. 0 is a master transmitting on voice sound channel,
   Nos. 1 to 5 are slaves transmitting on voice sound channel,
   the SH is a slave transmitting shared voice sound channel No. 5, and
   the LO is a receive-only slave.

13. The wireless communication device for a neck microphone of claim 12, wherein the ID No. 5 and the ID SH are selected according to an operation model, and
   when the ID of the communication terminal device is SH, the communication terminal device whose ID is SH is set as a slave to which a shared channel is assigned.

* * * * *